US012546437B2

(12) United States Patent
Xu

(10) Patent No.: US 12,546,437 B2
(45) Date of Patent: Feb. 10, 2026

(54) TELESCOPIC TRIPOD WITH LINKAGE LOCKING

(71) Applicant: Ningbo Langrui Technology Co., Ltd., Cixi (CN)

(72) Inventor: Longfeng Xu, Cixi (CN)

(73) Assignee: Ningbo Langrui Technology Co., Ltd., Cixi (CN)

( * ) Notice: Subject to any disclaimer, the term of this patent is extended or adjusted under 35 U.S.C. 154(b) by 50 days.

(21) Appl. No.: 18/630,646

(22) Filed: Apr. 9, 2024

(65) Prior Publication Data

US 2025/0164066 A1 May 22, 2025

(30) Foreign Application Priority Data

Nov. 20, 2023 (CN) .......................... 202323123997.3

(51) Int. Cl.
*F16M 11/34* (2006.01)
*F16B 7/14* (2006.01)

(52) U.S. Cl.
CPC ........... *F16M 11/34* (2013.01); *F16B 7/1427* (2013.01); *F16M 2200/025* (2013.01)

(58) Field of Classification Search
CPC .. F16M 11/34; F16M 2200/025; F16M 11/16; F16M 11/245; F16M 11/28; F16M 11/32; F16B 7/1427
USPC ......... 248/157, 163.1, 163.2, 164, 431, 166, 248/168, 169, 171, 172, 173
See application file for complete search history.

(56) References Cited

U.S. PATENT DOCUMENTS

| 544,466 | A | * | 8/1895 | Fisher | F16M 11/16 248/177.1 |
| 663,535 | A | * | 12/1900 | Essner et al. | F16M 11/16 248/188.5 |
| 757,766 | A | * | 4/1904 | Palmer | F16M 11/16 248/177.1 |
| 821,335 | A | * | 5/1906 | Butler | F16M 11/16 D16/244 |
| 1,495,458 | A | * | 5/1924 | Thalhammer | F16M 11/34 248/188.5 |
| 2,519,549 | A | * | 8/1950 | Coutant | F16M 11/16 D16/244 |
| 3,963,207 | A | * | 6/1976 | Guasti | F16M 11/36 248/188.5 |
| 5,320,316 | A | * | 6/1994 | Baker | F16M 11/36 248/163.1 |
| 6,286,795 | B1 | * | 9/2001 | Johnson | F16M 11/16 248/188 |

(Continued)

Primary Examiner — Muhammad Ijaz

(57) ABSTRACT

A telescopic tripod with linkage locking is provided, which includes a support base, and three sets of first support tubes are hinged on the support base along a circumferential direction, wherein a sliding seat is slidably installed on the first support tube, a second support tube is fixedly installed on a lower side of the sliding seat, an installation seat is installed at a lower end of the second support tube, and a third support tube is slidably installed inside the installation seat. The sliding seat is provided with a first compression member controlled by a locking member, the installation seat is provided with a second compression member connected to the locking member through a first steel cable, and the second compression member is in contact with the third support tube. The telescopic tripod can realize a joint locking effect and make the operation more convenient.

9 Claims, 6 Drawing Sheets

(56) References Cited

U.S. PATENT DOCUMENTS

| | | | | |
|---|---|---|---|---|
| 7,654,494 B2 * | 2/2010 | Cartoni | | G03B 17/561 |
| | | | | 248/163.1 |
| 8,317,141 B2 * | 11/2012 | Fischer | | F16M 11/36 |
| | | | | 396/419 |
| 8,534,620 B2 * | 9/2013 | Zierer | | F16M 11/36 |
| | | | | 248/163.1 |
| 9,027,895 B2 * | 5/2015 | Hunter | | F16B 9/056 |
| | | | | 403/333 |
| 10,281,081 B2 * | 5/2019 | Busarow | | F16M 11/26 |
| 11,608,934 B2 * | 3/2023 | Speggiorin | | F16B 7/1454 |
| 2001/0010764 A1 * | 8/2001 | Sherwin | | F16M 13/00 |
| | | | | 396/428 |
| 2004/0188575 A1 * | 9/2004 | Speggiorin | | F16B 7/105 |
| | | | | 248/188.91 |
| 2009/0072100 A1 * | 3/2009 | Zierer | | F16M 11/28 |
| | | | | 248/169 |
| 2010/0064739 A1 * | 3/2010 | Lu | | F16M 11/34 |
| | | | | 70/57 |
| 2013/0270405 A1 * | 10/2013 | Hunter | | F16M 11/36 |
| | | | | 248/125.8 |
| 2014/0301730 A1 * | 10/2014 | Johnson | | F16M 11/06 |
| | | | | 396/428 |
| 2015/0233521 A1 * | 8/2015 | Hida | | F16M 11/2078 |
| | | | | 248/429 |
| 2018/0274717 A1 * | 9/2018 | Busarow | | F16M 11/16 |
| 2019/0195419 A1 * | 6/2019 | Fiore | | F16B 7/105 |
| 2021/0010637 A1 * | 1/2021 | He | | F16M 11/16 |
| 2021/0254783 A1 * | 8/2021 | Speggiorin | | F16B 7/0433 |
| 2021/0396349 A1 * | 12/2021 | Speggiorin | | F16M 11/36 |
| 2023/0020970 A1 * | 1/2023 | Zahariev | | F16M 11/16 |
| 2023/0184372 A1 * | 6/2023 | Thomason | | F16B 7/1409 |
| | | | | 248/157 |
| 2025/0084959 A1 * | 3/2025 | Gorden | | F16M 11/34 |
| 2025/0155073 A1 * | 5/2025 | Van Dongen | | F16M 11/34 |
| 2025/0164066 A1 * | 5/2025 | Xu | | F16M 11/16 |
| 2025/0216752 A1 * | 7/2025 | Zhang | | F16M 11/242 |

* cited by examiner

TELESCOPIC TRIPOD WITH LINKAGE LOCKING

CROSS-REFERENCE

This application claims to the benefit of priority from Chinese Application No. CN202323123997.3 with a filing date of Nov. 20, 2023. The content of the aforementioned applications, including any intervening amendments thereto, are incorporated herein by reference.

TECHNICAL FIELD

The present disclosure relates to a telescopic support device, in particular to a telescopic tripod with linkage locking.

BACKGROUND

Most existing telescopic tripods is a three-stage telescopic structure, with a fixed mechanism between each section to fix the extended support rod. When the tripod is required in the lowest height, the support legs of tripod do not need to be stretched. When the tripod is required in the middle height, the support legs of tripod need to be stretched once and fastened by a fixed mechanism (the tripod has three support legs and needs to be operated three times) to fix it in a medium height state. When the tripod is required in the highest height, the support legs of tripod need to be stretched twice and fastened by the two fixed mechanisms. There is still room for improvement in the use and operation.

SUMMARY

In order to overcome the shortcomings of existing technology, the present disclosure provides a telescopic tripod with linkage locking.

The technical solution adopted by the present disclosure to solve its technical problems is:

A telescopic tripod with linkage locking, including a support base, and three sets of support tubes are hinged on the support base along a circumferential direction, wherein each set of the three sets of support tubes includes a first support tube, a second support tube and a third support tube, a sliding seat is slidably installed on the first support tube, a second support tube is fixedly installed on a lower side of the sliding seat, an installation seat is installed at a lower end of the second support tube, and a third support tube is slidably installed inside the installation seat; the sliding seat is provided with a first compression member controlled by a locking member, the first compression member is in contact with the first support tube, the installation seat is provided with a second compression member connected to the locking member through a first steel cable, and the second compression member is in contact with the third support tube.

A hinge member is installed at an upper end of the first support tube, a hinge seat is provided on the support base corresponding to the hinge member, and the hinge member is hinged on the hinge seat.

The number of the first support tube is two, the sliding seat is provided with a sleeve portion in symmetrical arrangement corresponding to the first support tube, the sleeve portion is sleeved on the first support tube, a rear side of the sliding seat is provided with a first opening, the first compression member is installed on the first opening, the sliding seat is provided with an installation groove, the locking member is rotatably installed in the installation groove, and the locking member is connected to the first compression member through a second steel cable.

A slot is provided on the locking member, one end of the second steel cable corresponding to the slot is provided with a clamp mounting part; the clamp mounting part is installed inside the slot, and an other end of the second steel cable is fixedly connected to the first compression member.

A handle portion for rotating the locking member is installed on an outer side of the sliding seat.

One end of the locking member is provided with a camshaft, and an upper end of the first steel cable is provided with a sleeve part corresponding to the camshaft, the sleeve part is fixedly connected to the camshaft, and a lower end of the first steel cable is fixedly connected to the second compression member.

A top surface of the second compression member is provided with a first inclined surface, and a second inclined surface is provided in the installation seat corresponding to the first inclined surface, and the first inclined surface is in contact with the second inclined surface.

A guide block is provided at an upper end of the third support tube, the guide block is provided with a notch corresponding to the second support tube, and the notch is clamped on the second support tube.

A foot pad is installed at a lower end of the third support tube.

The telescopic tripod further includes a lifting ring, a plug is installed at a lower end of the first support tube, the rear side of the plug is hinged with a connecting bracket, and the other end of the connecting bracket is hinged on the lifting ring.

The advantageous effect of the present disclosure is that: there are three sets of support tubes are hinged on the support base along a circumferential direction, wherein each set of the three sets of support tubes includes a first support tube, a second support tube and a third support tube, a sliding seat is slidably installed on the first support tube, a second support tube is fixedly installed on a lower side of the sliding seat, an installation seat is installed at a lower end of the second support tube, and a third support tube is slidably installed inside the installation seat. The sliding seat is provided with a first compression member controlled by a locking member, the first compression member is in contact with the first support tube, the installation seat is provided with a second compression member connected to the locking member through a first steel cable, and the second compression member is in contact with the third support tube. After stretching the second and third support tubes, the first compression member is controlled by the locking member to lock the first and second support tubes. At the same time, the second compression member is controlled by the first steel cable to lock the second and third support tubes, achieving a joint locking effect and making the operation more convenient.

BRIEF DESCRIPTION OF THE DRAWINGS

The following will further illustrate the present disclosure in conjunction with the accompanying drawings and embodiments.

DETAILED DESCRIPTION OF THE EMBODIMENT

Figure 1:
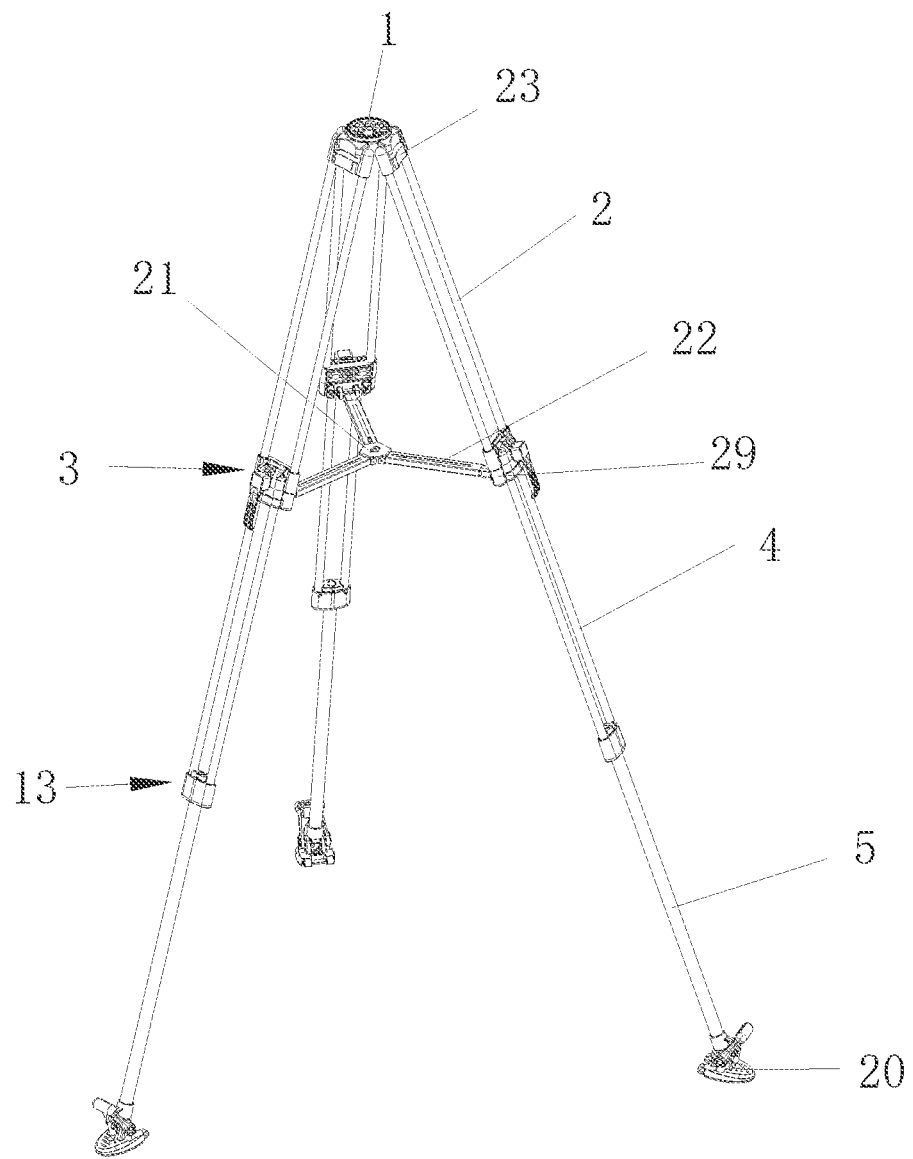
FIG. 1 is a schematic diagram of the present disclosure in extension state.
Figure 2:
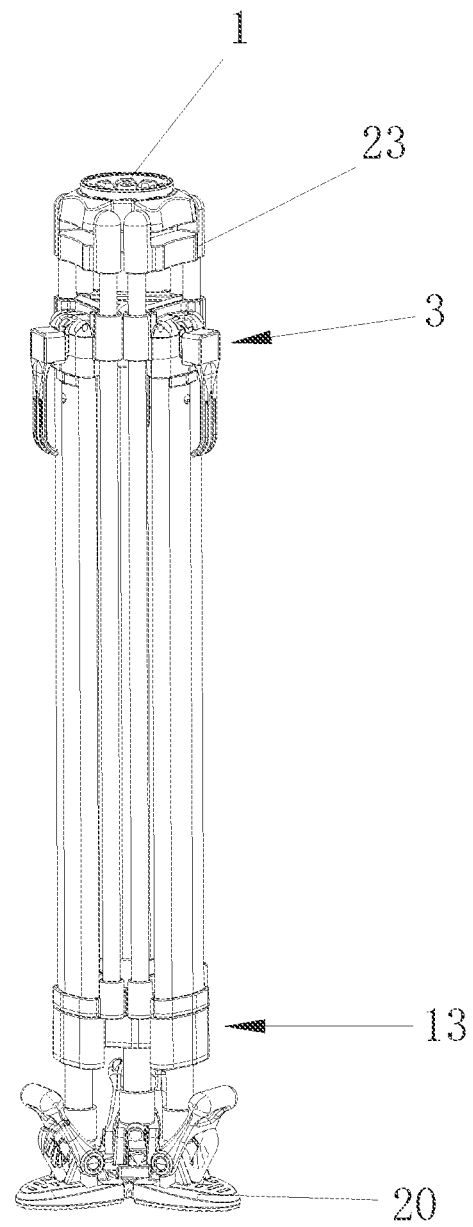
FIG. 2 is a schematic diagram of the present disclosure in contraction state.

In order to make the objective, the technical solution, and the advantages of the present disclosure clearer, the following will given a detailed illustration of the present disclosure, combined with specific embodiments and referring to the drawings. It should be noted that, without conflict, the embodiments of the present disclosure and the features in the embodiments can be combined with each other.

It should be understood that these descriptions are only illustrative and not intended to limit the scope of the present disclosure.

The following is descriptions of some embodiments of the present disclosure provided in conjunction with the drawings.

Please refer to FIG. 1-FIG. 6, a telescopic tripod with linkage locking is provided, which include a support base 1, and three sets of support tubes are hinged on the support base 1 along a circumferential direction, wherein each set of the three sets of support tubes includes a first support tube 2, a second support tube 4 and a third support tube 5. A sliding seat 3 is slidably installed on the first support tube 2, a second support tube 4 is fixedly installed on the lower side of the sliding seat 3, an installation seat 13 is installed at the lower end of the second support tube 4, and a third support tube 5 is slidably installed inside the installation seat 13. The sliding seat 3 is provided with a first compression member 7 controlled by a locking member 6, the first compression member 7 is in contact with the first support tube 2, the installation seat 13 is provided with a second compression member 8 connected to the locking member 6 through a first steel cable 9, and the second compression member 8 is in contact with the third support tube 5. After stretching the second support tube 4 and the third support tube 5, the first compression member 7 is controlled by the locking member 6 to lock the first support tube 2 and the second support tube 4. At the same time, the second compression member 8 is controlled by the first steel cable 9 to lock the second support tube 4 and the third support tube 5, achieving a joint locking effect and making the operation more convenient.

A hinge member 23 is installed at the upper end of the first support tube 2, a hinge seat is provided on the support base 1 corresponding to the hinge member 23, and the hinge member 23 is hinged on the hinge seat.

The number of the first support tube 2 is two, the sliding seat 3 is provided with a sleeve portion 10 in symmetrical arrangement corresponding to the first support tube 2, and the sleeve portion 10 is sleeved on the first support tube 2. The rear side of the sliding seat 3 is provided with a first opening 30, and the first compression member 7 is installed on the first opening 30. The sliding seat 3 is provided with an installation groove 11, the locking member 6 is rotatably installed in the installation groove 11, and the locking member 6 is connected to the first compression member 7 through a second steel cable 12. The second steel cable 12 penetrates into the first support tube 2.

The sliding seat 3 is equipped with an end cover 26. The end cover 26 is provided with an inner recessed part corresponding to the installation groove 11. After installing the end cover 26 on the sliding seat 3, the inner recessed part combines with the installation groove 11 to form a cylindrical cavity, and the locking member 6 is rotatably installed in the cylindrical cavity.

A handle portion 16 for rotating the locking member 6 is installed on the outer side of the sliding seat 3.

The lower side of the locking member 6 is equipped with a first connecting portion 27, and the handle portion 16 is provided with a second connecting portion 28 corresponding to the first connecting portion 27. The first connecting portion 27 is fixedly connected to the second connecting portion 28.

The outer side of the sliding seat 3 is provided with a second opening, and the second connecting portion 28 is connected to the first connecting portion 27 through the second opening, providing space for pulling the handle portion 16.

A slot 14 is provided on the locking member 6, one end of the second steel cable 12 corresponding to the slot 14 is provided with a clamp mounting part 15, and the clamp mounting part 15 is installed inside the slot 14. After installation, the axis of the clamp mounting part 15 does not coincide with the axis of the locking member 6, that is, the clamp mounting part 15 and the locking member 6 are not concentric circular structures. The other end of the second steel cable 12 is fixedly connected to the first compression member 7. When the locking member 6 rotates, the clamp mounting part 15 rotates around the axis of the locking member 6 and stretches the first compression member 7.

Figure 3:
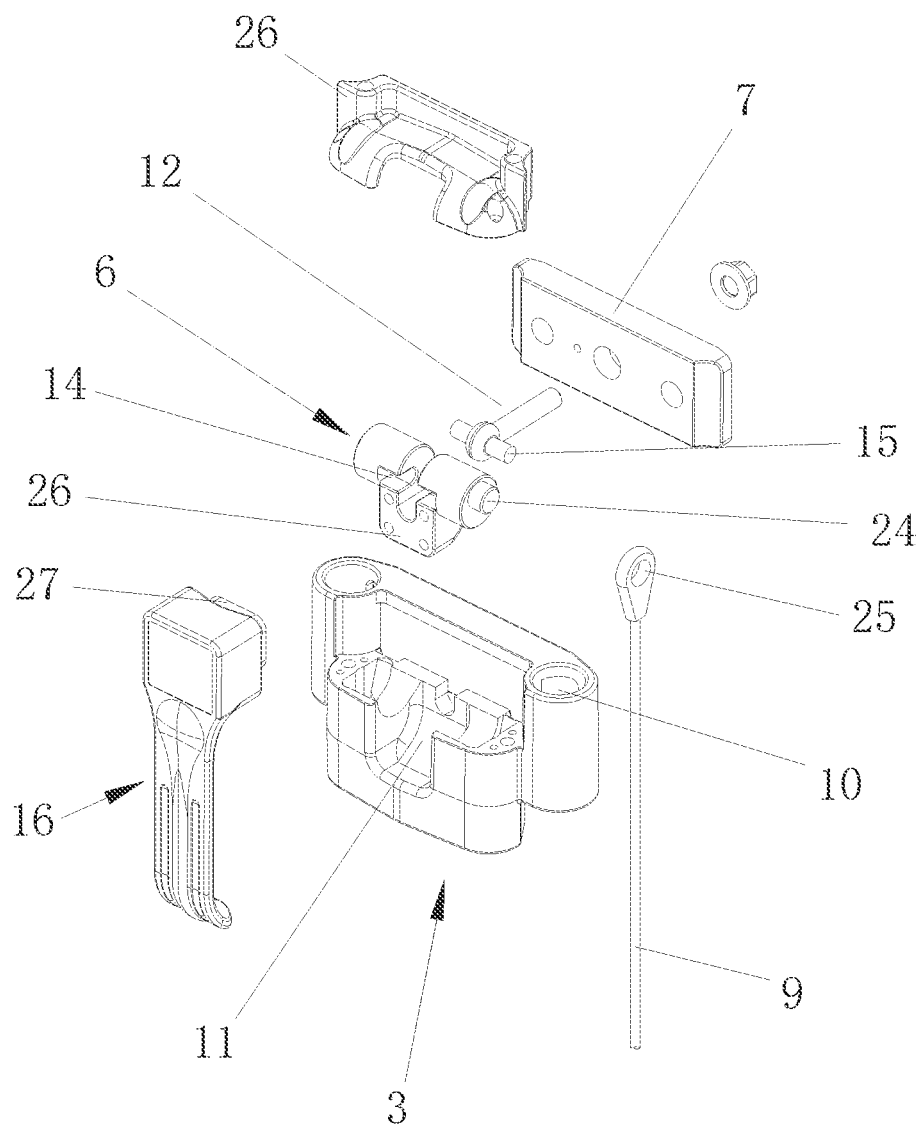
FIG. 3 is an exploded view of the sliding seat.
Figure 4:
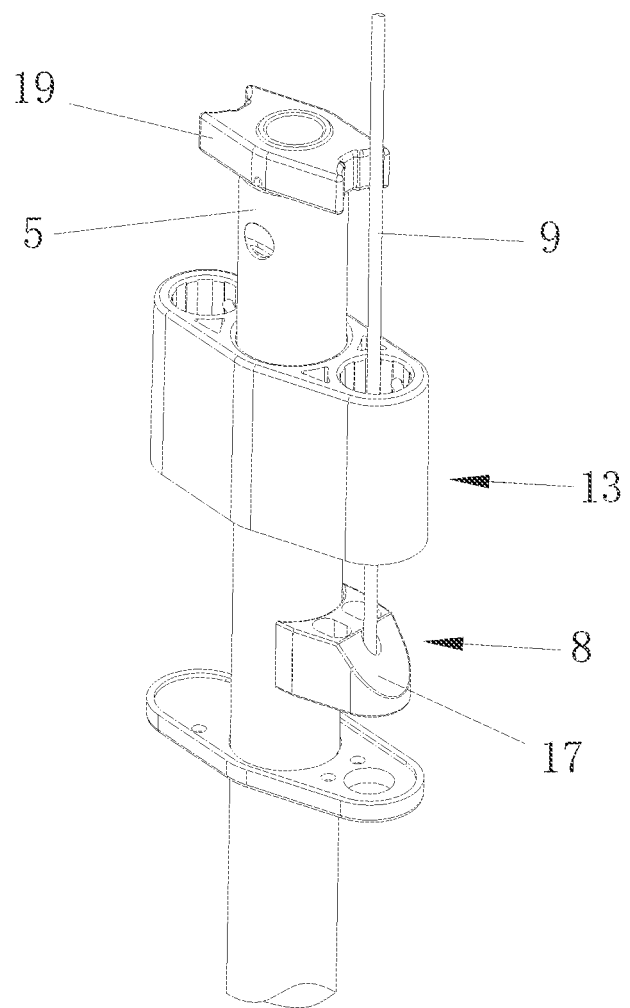
FIG. 4 is an exploded view of the installation seat.
Figure 5:
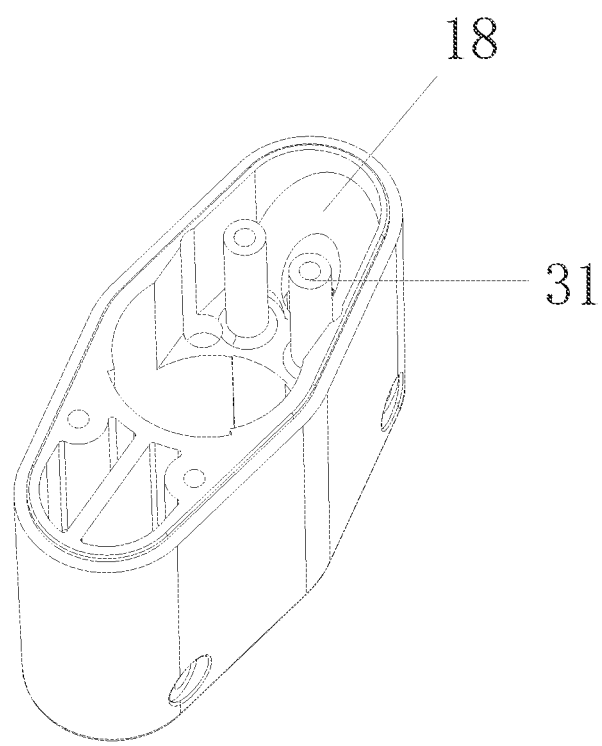
FIG. 5 is a structural diagram of the installation seat.
Figure 6:
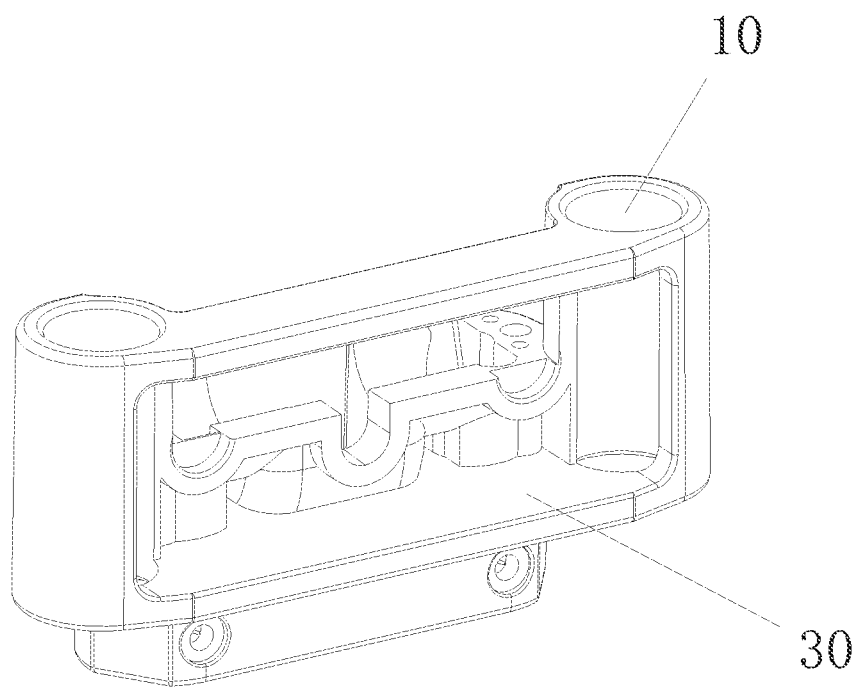
FIG. 6 is a structural diagram of the sliding seat.

One end of the locking member 6 is provided with a camshaft 24, as shown in FIG. 3, the axis of camshaft 24 does not coincide with the axis of locking member 6. The upper end of the first steel cable 9 is provided with a sleeve part 25 corresponding to the camshaft 24, the sleeve part 25 is fixedly connected to the camshaft 24, and the lower end of the first steel cable 9 is fixedly connected to the second compression member 8.

The top surface of the second compression member 8 is provided with a first inclined surface 17, a second inclined surface 18 is provided in the installation seat 13 corresponding to the first inclined surface 17, and the first inclined surface 17 is in contact with the second inclined surface 18.

The installation seat 13 is equipped with a cavity, and after the installation of the third support tube 5, the third support tube 5 forms a sliding groove with the inner wall of the installation seat 13. The second compression member 8 is slidably installed in the sliding groove. When the second compression member 8 slides in the sliding groove, it moves along the first inclined surface 17 and the second inclined surface 18 to make the second compression member 8 close to the third support tube 5, thereby compressing the third support tube 5.

A sliding rod 31 is provided inside the sliding groove in the installation seat 13, the second compression member 8 is provided with a sliding hole corresponding to the sliding rod 31, and the sliding rod 31 is slidably installed inside the sliding hole 31.

A guide block 19 is provided at the upper end of the third support tube 5, the guide block 19 is provided with a notch corresponding to the second support tube 4, and the notch is clamped on the second support tube 4.

A foot pad 20 is installed at the lower end of the third support tube 5.

The telescopic tripod further includes a lifting ring 21. A plug 29 is installed at a lower end of the first support tube 2, the rear side of the plug 29 is hinged with a connecting bracket 22, and the other end of the connecting bracket 22 is hinged on the lifting ring 21 (as shown in FIG. 1). When telescopic tripod is required to contract for storage, the lifting ring 21 is pulled to make the three first support tubes 2 of the tripod towards come to the center synchronously.

Linkage Locking Principle:

After stretching the second support tube 4 and the third support tube 5, lift and pull the handle portion 16 to rotate the locking member 6, thereby pulling the first compression member 7 through the second steel cable 12 to compress the first support tube 2 between the first compression member 7 and the sliding seat 3. At this time, the first support tube 2 and the second support tube 4 are locked, and at the same time, the camshaft 24 synchronously drives the sleeve portion 25 to make the second compression member 8 slide upwards through the first steel cable 9, along the first inclined surface 17 and the second inclined surface 18, so that the second compression member 8 can slide upwards diagonally. The second compression member 8 slides diagonally upwards to compact the third support tube 5. At this time, the second support tube 4 and the third support tube 5 are locked, achieving a joint locking effect.

The first compression member 7 and the second compression member 8 are both equipped with a reset spring to reset them. When the handle portion 16 is pressed, the locking member 6 rotates in the opposite direction, and the reset spring resets the corresponding first compression member 7 and second compression member 8, causing the first compression member 7 and the second compression member 8 to separate from the first support tube 2 and the third support tube 5, respectively. At this time, each support tube can be contracted.

The various support tubes of the present disclosure can achieve stepless height adjustment, that is, regardless of whether each support tube is stretched to any height (within the height range, the highest is to stretch all 3 sections of the support tubes entirely, and the lowest is to contract all 3 sections of the support tubes), by pulling the handle portion 16, the various support tubes can be locked. For example, the third support tube 5 can be stretched separately, the second support tube 4 can be stretched separately, and the third support tube 5 and the second support tube 4 can be stretched half of their lengths, respectively.

In the present disclosure, the term "a plurality of" refers to two or more, unless otherwise specified. The term "and/or" used in this disclosure includes any and all combinations of one or more related listed items. The terms "installation", "connection", "connected", "fixed" and other terms should be broadly understood. For example, "connection" can be a fixed connection, a detachable connection, or a connected as a whole; "connected" can be directly connected or indirectly connected through intermediate media. For ordinary skilled person in the art, the specific meanings of the above terms in the present disclosure can be understood based on specific circumstances.

It should be noted that when a component is referred to as "assembled on", "installed on", "fixed on" or "provided on" another component, it can be directly or indirectly on another component. When a component is considered to be "connected" to another component, it can be directly connected to another component or there may be other component between the two connected components. The terms "vertical", "horizontal", "up", "down", "left", "right" and similar expressions used in this disclosure are for illustrative purposes only and do not imply that they are the only means of implementation.

In the description of this specification, the terms "one embodiment", "some embodiments", "embodiments", etc. refer to the specific features, structures, materials, or features described in conjunction with the embodiment or example being included in at least one embodiment or example of the present disclosure. In this disclosure, the illustrative expressions of the above terms may not necessarily refer to the same embodiments or examples. Moreover, the specific features, structures, materials, or characteristics described can be combined in an appropriate manner in any one or more embodiments or examples.

Although embodiments of the present disclosure have been shown and described, those skilled in the art can understand that various changes, modifications, substitutions, and variations can be made to these embodiments without departing from the principles and purposes of the present disclosure. The scope of the present disclosure is limited by the claims and their equivalents.

What is claimed is:

1. A telescopic tripod with linkage locking, comprising a support base (1), and three sets of support tubes are hinged on the support base (1) along a circumferential direction, wherein each set of the three sets of the support tubes comprises a first support tube (2), a second support tube (4) and a third support tube (5), a sliding seat (3) is slidably installed on the first support tube (2), the second support tube (4) is fixedly installed on a lower side of the sliding seat (3), an installation seat (13) is installed at a lower end of the second support tube (4), and the third support tube (5) is slidably installed inside the installation seat (13); the sliding seat (3) is provided with a first compression member (7) controlled by a locking member (6), the first compression member (7) is in contact with the first support tube (2), the installation seat (13) is provided with a second compression member (8) connected to the locking member (6) through a first steel cable (9), and the second compression member (8) is in contact with the third support tube (5);

the number of the first support tube (2) in each set of the three sets of the support tubes is two, the sliding seat (3) is provided with a sleeve portion (10) in symmetrical arrangement corresponding to the first support tube (2), the sleeve portion (10) is sleeved on the first support tube (2), a rear side of the sliding seat (3) is provided with a first opening, the first compression member (7) is installed on the first opening, the sliding seat (3) is provided with an installation groove (11), the locking member (6) is rotatably installed in the installation groove (11), and the locking member (6) is connected to the first compression member (7) through a second steel cable (12).

2. The telescopic tripod with linkage locking according to claim 1, wherein a hinge member (23) is installed at an upper end of the first support tube (2), a hinge seat is provided on the support base (1) corresponding to the hinge member (23), and the hinge member (23) is hinged on the hinge seat.

3. The telescopic tripod with linkage locking according to claim 1, wherein a slot (14) is provided on the locking member (6), one end of the second steel cable (12) corresponding to the slot (14) is provided with a clamp mounting part (15); the clamp mounting part (15) is installed inside the slot (14), and an other end of the second steel cable (12) is fixedly connected to the first compression member (7).

4. The telescopic tripod with linkage locking according to claim 1, wherein a handle portion (16) for rotating the locking member (6) is installed on an outer side of the sliding seat (3).

5. The telescopic tripod with linkage locking according to claim 1, wherein one end of the locking member (6) is provided with a camshaft (24), and an upper end of the first steel cable (9) is provided with a sleeve part (25) corresponding to the camshaft (24), the sleeve part (25) is fixedly connected to the camshaft (24), and a lower end of the first steel cable (9) is fixedly connected to the second compression member (8).

6. The telescopic tripod with linkage locking according to claim 1, wherein a top surface of the second compression member (8) is provided with a first inclined surface (17), a second inclined surface (18) is provided in the installation seat (13) corresponding to the first inclined surface (17), and the first inclined surface (17) is in contact with the second inclined surface (18).

7. The telescopic tripod with linkage locking according to claim 1, wherein a guide block (19) is provided at an upper end of the third support tube (5), the guide block (19) is provided with a notch corresponding to the second support tube (4), and the notch is clamped on the second support tube (4).

8. The telescopic tripod with linkage locking according to claim 1, wherein a foot pad (20) is installed at a lower end of the third support tube (5).

9. The telescopic tripod with linkage locking according to claim 1, wherein the telescopic tripod further comprises a lifting ring (21), a plug (29) is installed at a lower end of the first support tube (2), the rear side of the plug (29) is hinged with a connecting bracket (22), and the other end of the connecting bracket (22) is hinged on the lifting ring (21).

\* \* \* \* \*